(12) United States Patent
Basak et al.

(10) Patent No.: US 9,612,751 B2
(45) Date of Patent: Apr. 4, 2017

(54) PROVISIONING ADVISOR (71) Applicant: NetApp, Inc., Sunnyvale, CA (US)

(72) Inventors: Jayanta Basak, Bangalore (IN); Madhumita Bharde, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 43 days.

(21) Appl. No.: 14/724,744

(22) Filed: May 28, 2015

(65) Prior Publication Data

US 2016/0349992 A1 Dec. 1, 2016

(51) Int. Cl.
*G06F 12/00* (2006.01)
*G06F 3/06* (2006.01)

(52) U.S. Cl.
CPC ............ *G06F 3/061* (2013.01); *G06F 3/0605* (2013.01); *G06F 3/067* (2013.01); *G06F 3/0647* (2013.01); *G06F 3/0653* (2013.01)

(58) Field of Classification Search
None
See application file for complete search history.

(56) References Cited

U.S. PATENT DOCUMENTS

| | | | | |
|---|---|---|---|---|
| 2011/0072208 A1* | 3/2011 | Gulati | ................... | G06F 3/0613 711/114 |
| 2012/0054329 A1* | 3/2012 | Gulati | ................. | H04L 67/1002 709/224 |
| 2013/0227145 A1* | 8/2013 | Wright | .................. | G06F 9/5083 709/226 |

* cited by examiner

*Primary Examiner* — Gurtej Bansal
(74) *Attorney, Agent, or Firm* — Klein, O'Neill & Singh, LLP (57) ABSTRACT

A method and system for a provisioning advisor are described which estimates the input/output operation performance of a workload on a storage system. A regression module in a provisioning advisor estimates a maximum IOPS on the storage system for buckets, or combinations of values, for various characteristics of the workloads running on the system by modeling a relationship between the workload characteristics and performance metrics gathered from the storage system. A performance module can use the estimated maximum IOPS for each bucket to update a set of working tables for the provisioning advisor, which can then be used to predict the input/output performance of a new workload to be provisioned on the storage system.

18 Claims, 5 Drawing Sheets

PROVISIONING ADVISOR

TECHNICAL FIELD

Examples described herein relate to storage systems, and more specifically, to a system and method for an adaptive workload provisioning advisor.

BACKGROUND

Due to a lack of generic, accurate, dynamic, and comprehensive models for performance estimation, users often under-provision or over-provision storage systems. With multi-tenancy, virtualization, scaled, and unified storage becoming the norm in the industry, it is important to strike an optimum balance between utilization and performance. However, performance prediction for storage systems can be difficult considering that there are multiple hardware and software layers cascaded in a complex way that affect the behavior of the system. Configuration factors such as CPU, cache size, RAM size, capacity, storage backend (HDD/Flash), network cards, etc. have a significant effect on number of Input/Output Operations per Second (IOPS) that can be pushed to the system.

There is a competitive advantage for storage providers to increase utilization of their resources while maintaining performance guarantees. A storage resource can be optimally operated at the "knee of the curve" (e.g., approximately 70% of resource utilization) as a general rule of thumb. However, identifying this point in a dynamic manner can be challenging. The situation becomes more complicated for a mix of various different workloads since the response time behavior is different depending on the workload characteristics. Also, any aggressive provisioning of the storage resources can result in performance impacts hitting the bottom-line of the resource provider. To avoid such situations, storage providers often under-provision systems to be safe, which results in systems being under-utilized.

Optimum resource utilization is also crucial in cloud computing environments. Usually, cloud providers thin provision resources and need to be able to seamlessly provision containers, migrate virtual machines (VMs), and redistribute the resource pool among client applications. Therefore, it is important to estimate the actual maximum throughput that can be delivered for various different application environments.

This throughput modeling is typically done via two approaches—white-box and black-box. In white-box models, each component such as the CPU, disks, network utilization, and memory are individually modeled by applying queueing theory. For each component, the queueing delay for each IO request is computed, and these individual models are combined to obtain the overall response time for given IO request patterns. Black-box models model the entire system as a single black box and use machine learning techniques to predict the relationship between IO patterns and response times. White-box models are usually static in nature but highly tunable in terms of systems parameters. On the other hand, black-box models can be applied in dynamic environments but are more difficult to tune.

DETAILED DESCRIPTION

Typically, input/output (IO) response times in a storage system are dependent on the characteristics of workloads running on the system. For example, a read-intensive workload can have different system response times compared to a write-intensive workload. In white-box models, each IO request is categorized as a read or write request, and then a corresponding response time is estimated. Finally, these response times are aggregated over a composite model of system components. In the black-box approach, since there are no constituent component models considered, the response times are modeled depending on the workload characteristics.

Response times remain mostly constant in low IOPS situations even when more IOPS are pushed into the storage system. After the number of Input/Output Operations per Second (IOPS) reaches a certain point, referred to as a "knee," the latency rapidly increases within a short range of IOPS. If IOPS are increased even further, after a point, no more IOPS can be pushed into the system and the latency can shoot up drastically. In practice, it is very difficult to provide a quantitative relationship between the maximum IOPS and this "knee of the curve." Some recent attempts have been made to quantify the relationship between the maximum IOPS and the knee using a queuing modeling framework. Depending on the type of the queuing model, the "knee" exhibits different relationship with the maximum IOPS.

Many black-box modeling techniques predict the response time (latency) for certain IOPS based on an interpolation mechanism. Extrapolation techniques predict the response time for certain IOPS in the unseen region. For example, if the black-box is trained in the region of 0-5000 IOPS and asked to predict the response time for 7000 IOPS, then it becomes an extrapolation problem. However, it can be difficult to apply extrapolation in mixed workload situations because different workloads are typically deployed in different volumes, and having 10-20 volumes is not unusual in current storage system configurations. For such cases, predictions for new volumes in the absence of the existing volumes can be inaccurate in the presence of existing volumes. In addition, it is important to provision new volumes so that they don't negatively impact the performance of existing volumes. It is beneficial for customers to know the maximum possible IOPS that the system may provide for a new volume or workload even before it is actually provisioned. Existing black-box approaches are not capable of handling these challenges, and although white-box models can appropriately capture the resource constraints, they are not generic or dynamic. However, apart from system characteristics, storage workloads can vary considerably, and therefore IOPS numbers depend on the types of workloads provisioned on the storage system.

To solve these challenges, a provisioning advisor learns the system behavior in terms of characterizing the dependency of response time (latency) and IOPS. It also uses the concepts from queueing theory to model the mixture of workloads on multiple volumes (logical containers) in an aggregate (set of disks). An IOPS dashboard can display or act on predictions of the maximum IOPS possible per volume basis in an aggregate on a node. In order to predict IOPS per volume even with interference of the workloads in different volumes, the provisioning advisor first estimates the maximum IOPS possible using certain robust regression techniques. Next, it accounts for storage system utilization and models the interference of multiple volumes in an aggregate using utilization theory. Performance estimates also constantly take feedback from the storage system environment and dynamically adapt to changes in configuration, system upgrades, and file system aging and fragmentation. Maximum IOPS predictions can then be updated by taking into account the effect of these factors.

In an example, input/output operation performance of a workload on a storage system is predicted. A regression module in a provisioning advisor estimates a maximum IOPS on the storage system for buckets, or combinations of values, for various characteristics of the workloads running on the system by modeling a relationship between the workload characteristics and performance metrics gathered from the storage system. A performance module can use the estimated maximum IOPS for each bucket to update a set of working tables for the provisioning advisor, which can then be used to predict the input/output performance of a new workload to be provisioned on the storage system.

In some aspects, a set of master tables are first created by estimating the maximum IOPS for a plurality of workloads on the storage system or a system with the same hardware and/or software configuration. When the storage system is commissioned, the set of master tables is copied into the set of working tables.

According to some examples, the predicted input/output operation performance of the workload can be displayed to a user of the storage system on a dashboard. Alternatively or in addition, the storage system can automatically re-provision workloads based on the predicted input/output operation performances.

In some aspects, the prediction of the input/output operation performance of the new workload on the storage system also takes into consideration the current utilization of the storage system. In further aspects, the workload characteristics can include randomness of IO, IO size, and a distribution between read and write IO. In addition, modeling the relationship between workload characteristics and the observed performance metrics can use a robust linear regression.

The prediction of maximum IOPS can be extended for many interesting use cases, such as finding (1) the maximum number of IOPS that can be pushed for an existing workload, (2) a maximum number of IOPS for a new workload, given its characteristics, (3) the effect on existing workloads if a new workload is provisioned or migrated, (4) what would be the optimal location to provision a new workload in a storage cluster, and (5) whether workloads can be redistributed within the cluster for better storage system utilization and performance. A dashboard can be provided to allow users or storage system admins to react to this data, or the storage systems themselves can automatically provision and migrate workloads for optimal performance.

As used herein, "IOPS" refers to a performance measurement of input and output operations per second, which is used to benchmark computer storage devices like hard disk drives (HDD), solid state drives (SSD), and storage area networks (SAN). An "aggregate" refers to physical storage in a storage system and comprises one or more raid groups of disks.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Overview

Figure 1:
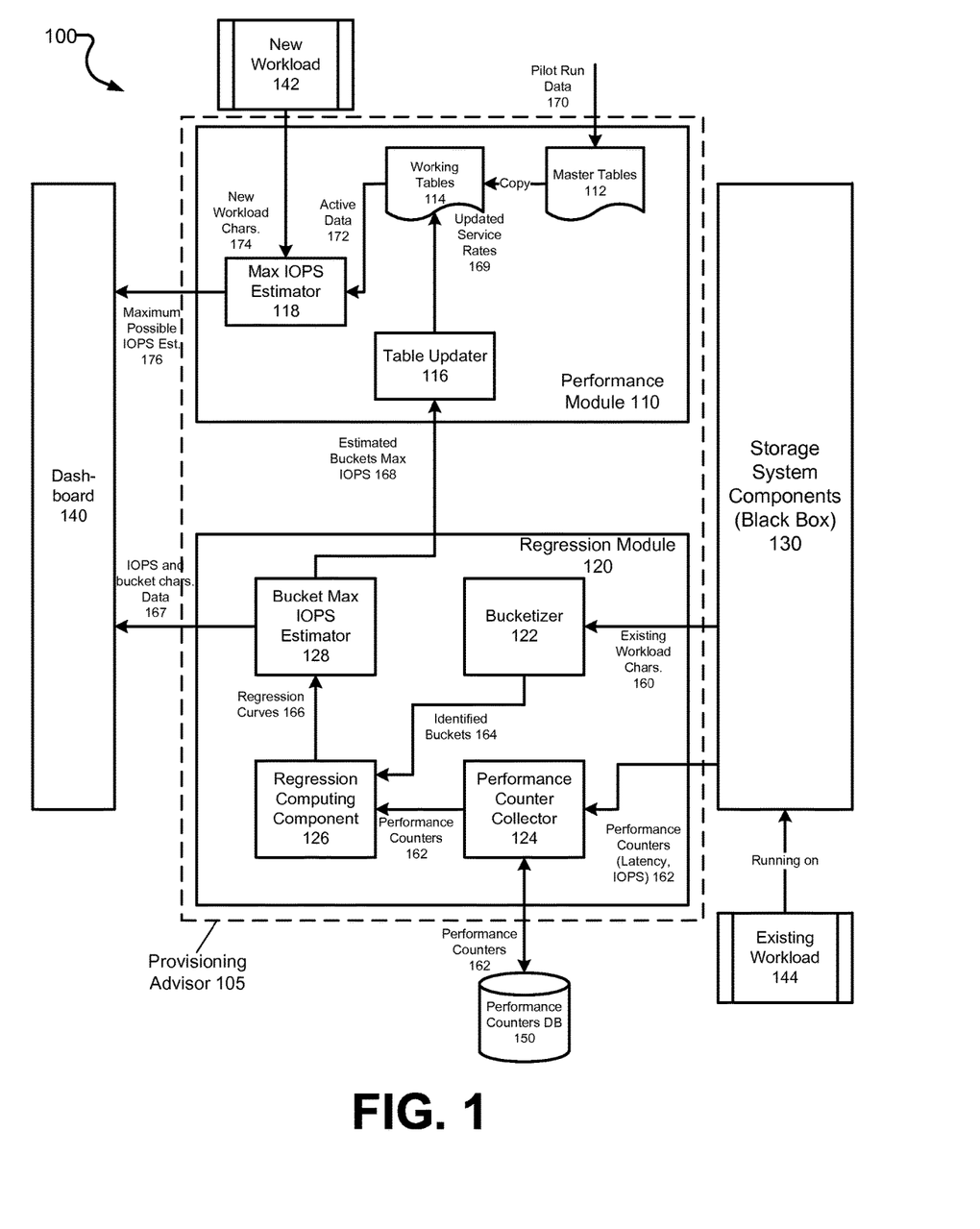
FIG. 1 illustrates an example system for a provisioning advisor, in accordance with some aspects.

FIG. 1 illustrates a storage system environment 100, within which a provisioning advisor 105 may be provided. The deployment architecture of the provisioning advisor 105 includes two modules as shown in FIG. 1. One module (performance module 110) stores the workload characteristics-based service rate tables as master tables 112 and a set of working tables 114. The working tables 114 are derived from existing workloads 144 running on the storage server by mining the existing workloads 144 into existing workload characteristics 160. During system operation, performance module 110 derives the utilization of the storage system by viewing it as a black-box of components 130 and then predicts the maximum possible IOPS estimates 176 for a new workload 142. The second module (regression module 120) stores the performance counters 162 measured from the storage system components 130 in performance counters database 150. Output from regression module 120 is used to dynamically update the working tables 114 to take into account factors like aging, configuration changes, system upgrades, etc.

When a storage system is commissioned, the master tables 112 are created for certain aggregate sizes using pilot run data 170 from an in-house pilot run, which are populated in performance module 110. In some aspects, the storage system components 130 are uniform across a known model number of storage system, and the pilot run data 170 can be used for all storage systems with the same configuration. When a new workload 142 is provisioned in an aggregate for a newly-commissioned storage system, an active performance table, or working table 114, is first created as a copy of the master table 112. The maximum IOPS for the new workload 142 is estimated by a max IOPS estimator 118 using the new workload's characteristics 174 and active data 172 from the working tables 114, which can then be scaled according to the aggregate size. In some aspects, a storage system admin can supply the new workload characteristics 174 during the maximum IOPS estimation. These new workload characteristics 174 may be known from previous testing data. Alternately, default new workload characteristics 174 can be chosen according to the type of the new workload 142.

During storage system operation, regression module 120 gathers performance counters 162 and characteristics of existing workloads 144 to update the working tables 114 in performance module 110 and provide data to the dashboard 140. In some aspects, dashboard 140 can be deployed outside of the storage system environment 100 and can manage multiple storage systems, for example by allowing an admin to move workloads from one storage system node to another.

Observations show that a few workload characteristics (e.g., read/write sizes, read %, random %) are enough to capture the essence of the workload under study and that these effectively dictate system performance in terms of maximum possible IOPS. Observed maximums when the system is driven to saturation compared with predicted maximums from the theory based on Little's law have shown an acceptable error margin of up to 15%.

When workloads are running, performance counter collector 124 captures performance counters 162 by treating the storage system as a black box of components. In some aspects, these performance counters 162 are stored in a performance counters database 150 for later use. In addition, bucketizer 122 captures existing workload characteristics 160 of the existing workloads 144 and assigns them to appropriate buckets. Each identified bucket 164 consists of several samples of performance counter measures available for that bucket. Once the performance counters 162 have been collected over a period of time, the regression computing component 126 can estimate the latency vs outstanding IO curves for each of the identified, or non-empty, buckets. From these regression curves 166, the bucket max IOPS estimator 128 can estimate the max IOPS for each of the non-empty buckets. When multiple workloads are provisioned on the system, the estimated buckets max IOPS 168 can be normalized. In either case, the estimated buckets max IOPS 168 are sent to the performance module table updater 116, which compares them with the working tables 114 and incrementally modifies the working tables 114 if there are any mismatches.

In some aspects, the IOPS and bucket characteristics data 167 can be provided to the dashboard 140 for use by a system admin or automated process to, for example, re-provision workloads more efficiently.

Methodology

Figure 2:
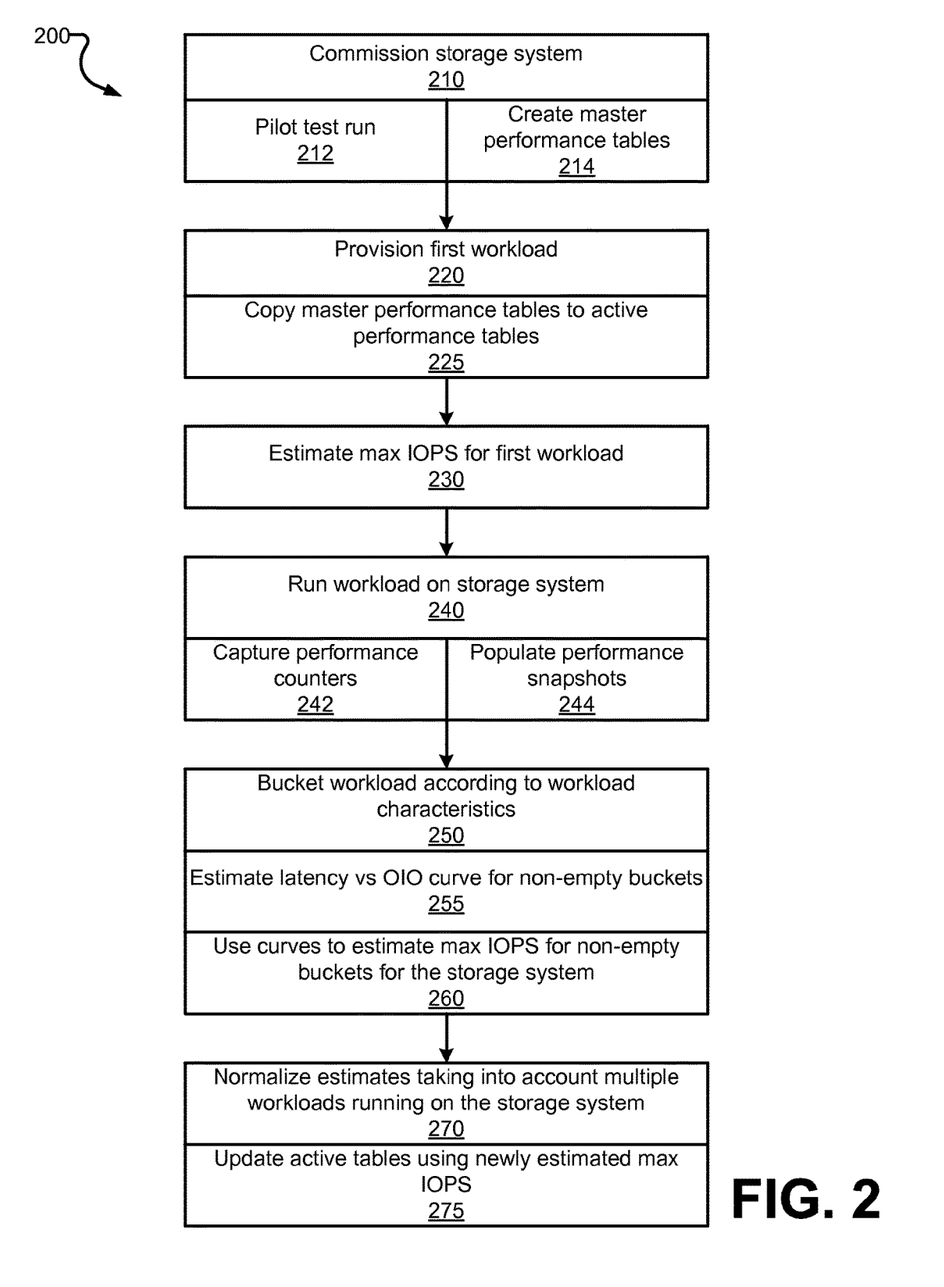
FIG. 2 illustrates an example method for operating a provisioning advisor on a storage system, in accordance with some aspects.
Figure 3:
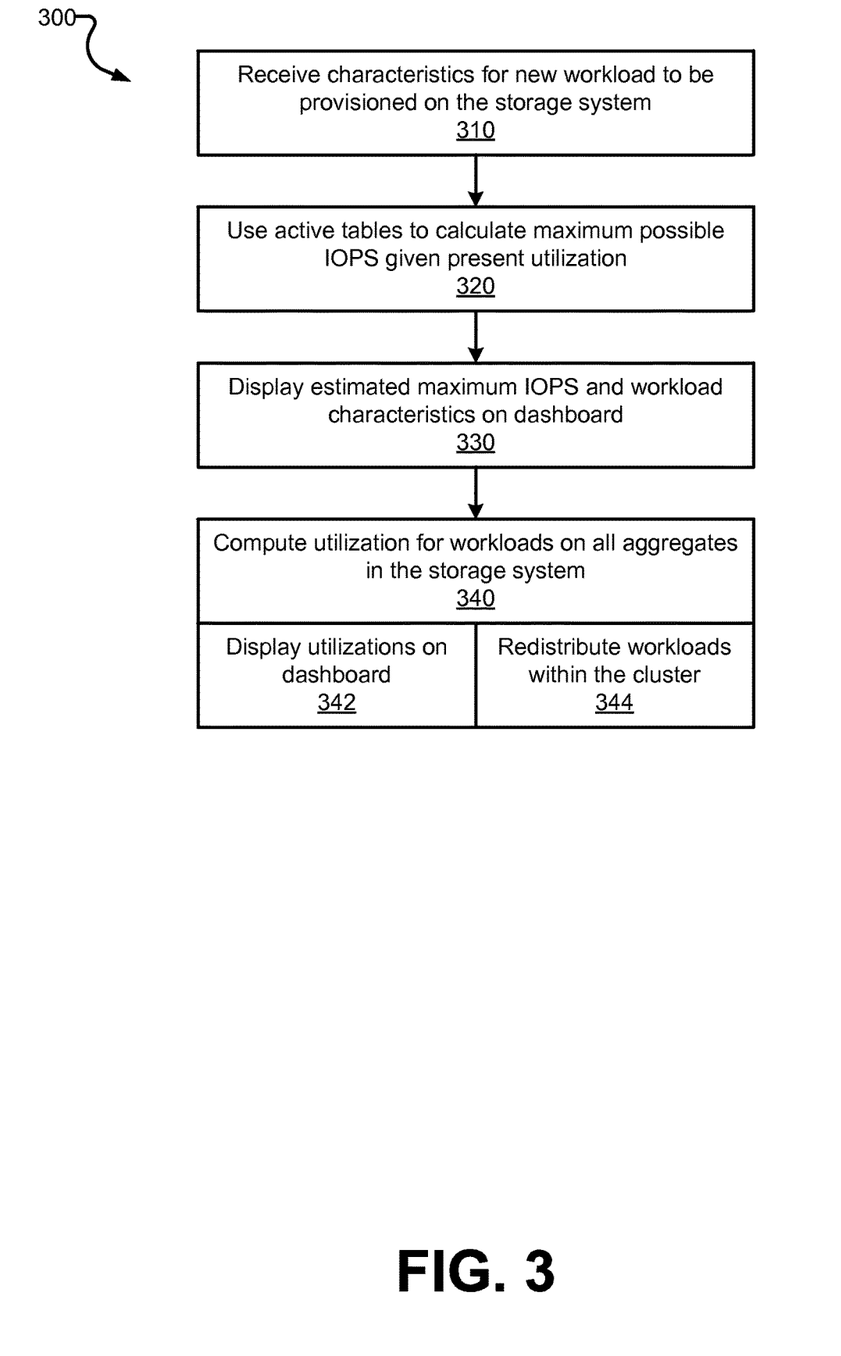
FIG. 3 illustrates an example method for provisioning a new workload on a storage system with a provisioning advisor, in accordance with some aspects.
Figure 4:
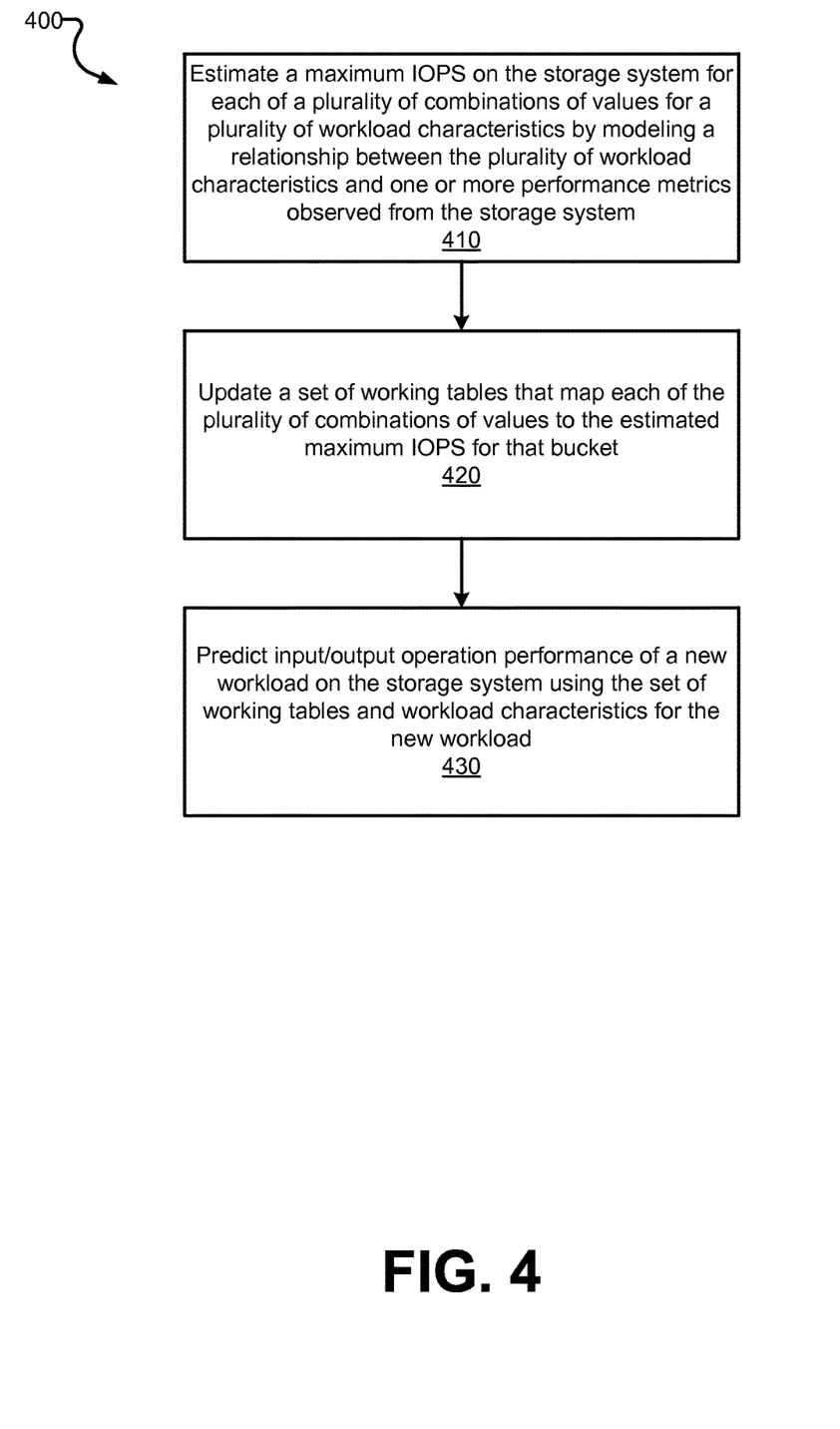
FIG. 4 illustrates an example method for predicting input/output operation performance of a new workload on a storage system, in accordance with some aspects.

FIG. 2 illustrates an example method for operating a provisioning advisor 105 on a storage system, in accordance with some aspects. FIG. 3 illustrates an example method for provisioning a new workload 142 on a storage system with a provisioning advisor 105, in accordance with some aspects. FIG. 4 illustrates an example method for predicting input/output operation performance of a new workload 142 on a storage system, in accordance with some aspects. While operations of the methods 200, 300, and 400 are described below as being performed by specific components, modules or systems of the storage system environment 100, it will be appreciated that these operations need not necessarily be performed by the specific components identified, and could be performed by a variety of components and modules, potentially distributed over a number of machines. Accordingly, references may be made to elements of storage system environment 100 for the purpose of illustrating suitable components or elements for performing a step or sub step being described. Alternatively, at least certain ones of the variety of components and modules described in storage system environment 100 can be arranged within a single hardware, software, or firmware component. It will also be appreciated that some of the steps of this method may be performed in parallel or in a different order than illustrated.

In some aspects, the storage system is modelled as a single M/M/1 queue, which represents the queue length in a system having a single server, where arrivals are determined by a Poisson process and job service times have an exponential distribution. This is a reasonable assumption under certain conditions where (1) the CPU is not the bottleneck, (2) network bandwidth is available, and (3) reads are not entirely served from cache and are hitting the backend.

The outstanding IO (OIO) is a measure of the queue length (depth). Little's Law states that the long-term average number of customers in a stable system L (i.e., OIO) is equal to the long-term average effective arrival rate, $\lambda$ (i.e., IOPS), multiplied by the (Palm-)average time a customer spends in the system, W (i.e., latency); or expressed algebraically: L=$\lambda$W. Applying Little's Law to the M/M/1 queue, the queue length, or the OIOs, can be expressed as:

$$\text{OIO} = \text{Latency} * \text{IOPS} \tag{1}$$

For higher IOPS, latency is directly proportional to outstanding IOs to be served. Therefore, for constants a and b, the following equation holds:

$$\text{Latency} = a*\text{OIO} + b \tag{2}$$

From these equations, latency can be expressed as:

$$\text{Latency} = \frac{b}{1 - a*\text{IOPS}} \tag{3}$$

As the storage system gets saturated, latency tends to infinity. From this question, maximum IOPS can be expressed as:

$$\text{Maximum IOPS} = 1/a \tag{4}$$

Note that equation (2) is true asymptotically. For smaller IOPS numbers, the relationship may not hold true; however, the system is modelled for higher IOPS ideally in the saturation region. As is evident from equation (4), maximum IOPS is the inverse of slope of the line representing the linear relationship between latency and OIO. A value of (1/a) could also be considered as the service rate of the system for a given workload. For existing workloads 144 running on the storage system, periodic measurements of performance counters 162 (Latency, IOPS) are gathered from the system. These performance counters 162 are used in a robust regression between latency and OIO by the regression computing component 126 to find the inverse of the slope of the regression line, which forms the estimate for the maximum TOPS possible for the specific workload in a given identified bucket 164.

The relationship between latency and outstanding IO is dependent on a number of system and workload factors. However, observations have shown that workload characteristics can define this relationship when some reasonable assumptions for the system are made. While it is safe to assume that majority of workloads generally show variation of intensity (e.g., over a week, during holidays, at peak hours, etc.) but hardly any change in characteristics (e.g., read/write sizes, read/write ratios, and sequential/random ratios), there are examples of some real life workloads that exhibit several groups or a range of characteristics, causing wide and divergent latency vs OIO behavior. Workloads such as these can have their parameters (e.g., IO size, random %, read %) dynamically determined by collecting some additional performance counters 162 which show different workload characteristics manifesting as different latency vs OIO orientation and consequently different latency vs IOPS hockey stick regions.

According to some aspects, the provisioning advisor 105 can determine the maximum IOPS for an existing workload 144 as well as for a new workload 142. For any existing workload 144, the regression computing component 126 can perform a robust regression between the latency and the IOPS for that workload.

With reference to an example of FIG. 2, when a new storage system is commissioned, the maximum IOPS for volumes in the system can be estimated using known workload characteristics for different workload types (210). In some situations, the CPU can become a bottleneck when high numbers of IOPS are pushed through the storage system. However, in general use, the workload characteristics (e.g., read/write ratio, random percentage, block size) are the primary factor determining the maximum possible IOPS for a workload in a volume. In one example, in order to determine the maximum possible IOPS, or service rate, a pilot test run is performed on the storage system for different workload characteristics (212). This pilot run can be performed with any appropriate performance testing tool such as SIO. Since the service rate only depends on the characteristics with a given system configuration, once the pilot test run has been performed for a specific system configuration, the same data can be applied to future storage systems with the same configuration. Therefore, once a system is commissioned, master performance tables of service rates for different workload characteristics can be provided from previous pilot test runs or newly created (214). In some aspects, sets of master tables 112 are created for different aggregate sizes. In addition, with some examples it is assumed that the maximum IOPS is proportional to the number of disks in the aggregate.

TABLE 4

New Workload Provisioning: Master Table (SIO Random % = 100)

| | Read % | | | | | |
|---|---|---|---|---|---|---|
| IO size | 0% | 20% | 40% | 60% | 80% | 100% |
| 4k | 19068 | 20150 | 19896 | 19975 | 20825 | 21473 |
| 8k | 14002 | 15355 | 14974 | 14869 | 14877 | 12765 |
| 16k | 7147 | 8864 | 10600 | 10003 | 8603 | 7123 |
| 32k | 3605 | 4460 | 5852 | 5776 | 4511 | 3595 |
| 64k | 1805 | 2255 | 2886 | 2833 | 2274 | 1808 |

In this example master table, maximum observed IOPS are shown for workload characteristics SIO Random % 100%, IO sizes 4 k-64 k bytes, and Read % 0-100%. This table shows that when a workload's IO operations are fall in the bucket of 16 k bytes, 40% reads, and 100% randomness, the storage system achieves 10,600 maximum IOPS.

When a new workload 142 is provisioned in an aggregate for a newly-commissioned storage system, an active performance table is first created as a copy of the master table (220, 225). The maximum TOPS for the new workload 142 is estimated using the active table and scaled according to the aggregate size (230). In some aspects, a storage system admin can supply the new workload characteristics 174 for the maximum IOPS estimation. These new workload characteristics 174 may be known from previous testing data or be otherwise publicly available. Alternately, default new workload characteristics 174 can be chosen according to the type of the new workload 142. For example, characteristics from a similar type of workload can be used if the characteristics of the new workload 142 are not known.

As is evident from experimentation, observations in different IO size buckets are clearly segregated in separate regions. For such cases, different maximum IO estimates can be calculated based on currently observed workload characteristics. These workload parameters are assigned to different buckets, and for each bucket the service rate (and in turn the maximum IOPS estimate) can be determined separately.

For a running workload, the maximum IOPS is advised by regression module 120 according to the maximum IOPS estimated from the performance counters 162. When the workload starts running (240), performance counters 162 are captured (242) and recent snapshots of performance counters 162 are populated in regression module 120 (244). In regression module 120, bucketizer 122 places the existing workload 144 into various buckets according to the existing workload's characteristics (250). In some aspects, each bucket consists of several samples of performance counter measurements available for that bucket. A particular workload can consist of several different workload characteristics profiles which each fit in a different bucket. However, there can be many buckets that remain empty because the workload does not perform IO with workload characteristics profiles matching the empty buckets.

TABLE 1

Observed maximum IOPS for different buckets of workload characteristics.

| | Read % | | | | | |
|---|---|---|---|---|---|---|
| IO size | 0% | 20% | 40% | 60% | 80% | 100% |
| 4k | 20656 | 20896 | 20325 | 20658 | 20879 | 21367 |
| 8k | 13931 | 15354 | 15341 | 15045 | 14684 | 12698 |
| 16k | 7155 | 8794 | 10608 | 9833 | 8476 | 7123 |
| 32k | 3593 | 4479 | 5804 | 5715 | 4398 | 3583 |
| 64k | 1802 | 2258 | 2867 | 2820 | 2228 | 1804 |

This table illustrates buckets of varying IO sizes and read/write IO percentages. For example, workloads with a characteristics profile of 64 kbyte IO that are 100% reads have been observed to have 1804 maximum IOPS in the storage system.

Once the performance counters 162 are collected over a period of time, the latency vs. OIO curve is estimated for non-empty buckets in regression module 120 (255). From these curves, the maximum IOPS is estimated for the non-empty buckets for the running workload (260). If multiple workloads are provisioned then the estimated maximum IOPS can be normalized (270). Since for a given system, the maximum IOPS for a workload depends only on the workload characteristics, the estimated maximum IOPS for the non-empty buckets are agnostic of the workload type.

Regression module 120 sends the estimated maximum IOPS values for the non-empty buckets to performance module 110. Performance module 110 then compares the estimated maximum IOPS with that in the active tables and incrementally modifies the active tables if there is any mismatch (275).

Provisioning New Workloads

With reference to an example of FIG. 3, the provisioning advisor 105 can use the workload characteristics table approach to give maximum possible IOPS estimates 176 before provisioning a new workload 142 in, for example, a storage system environment 100 as described with FIG. 1.

As previously discussed, one of the major drawbacks of existing approaches to workload estimates is that periodic measurements of certain metrics are needed from a storage system to estimate workload performance. With these approaches, that means the workload has to be provisioned on the storage system before an estimate can be given. However, since workload characteristics can abstract the workload itself, as demonstrated, it is possible to give performance estimates prior to provisioning the workload when the workload characteristics are known. As it turns out, these characteristics are already generally known for many workloads relevant to a storage system. As a result, a storage admin can provide this information to the storage system (310). In other aspects, workload characteristics can be determined based on a pilot run or other testing and profiling.

Whenever a new workload 142 is to be provisioned on the storage system, the new workload characteristics 174 can be compared with the modified active tables in performance module 110 in order to calculate the possible maximum IOPS (320). In addition, the present utilization of other workloads running on the storage system can be factored in to the maximum IOPS calculation for the new workload 142.

Interference of Multiple Workloads

Since workloads are rarely run alone on storage systems, the interference in performance when running multiple workloads is factored in to maximum IOPS calculations to give more complete provisioning advice for storage systems. For mixed workload modelling, the storage system can be viewed as a black box consisting of the controller, disks, CPU, memory, cache, and other architectural components 130 that all cater to IO operations. Performance counters 162 for read/write IOPS, latency, etc. are taken at the entry point of the system as illustrated in FIG. 1.

Let $\lambda$ be the arrival rate of requests and $\mu$ be the service rate of the storage system for a certain workload. In this case, the utilization ($\rho$) of the black box for this workload is given as $$\text{Utilization} = \rho = \frac{\lambda}{\mu} \quad (5)$$

Given a system with n different workloads provisioned, the total utilization is $$\rho = \sum_{i=1}^{n} \rho_i \quad (6)$$

where $$\rho_i = \lambda_i / \mu_i$$

Applying this for new workload provisioning, if the current utilization for the system ($\rho$) and service rate for new workload ($\mu_{new}$) are known, it follows that $$\text{Maximum IOPS} = (1-\rho) * \mu_{new} \quad (7)$$

In other words, the service rate for a particular workload is the maximum possible IOPS that can be catered to when the workload is run on the storage system in stand-alone mode. The true maximum IOPS that is possible for a workload depends on how much the storage system is already utilized. For example, if the current utilization of the storage system is 60%, then only 40% of the maximum IOPS that is possible in stand-alone mode is available to the new workload 142.

This relationship is also completely agnostic of the workload type that is running on the storage system. It only requires the service rates for different workloads, and the service rates depend on the workload characteristics. Therefore, the provisioning advisor 105 can compute service rates for different workload types and then compute the resultant utilization of the storage system. Once the total utilization is known, the residual utilization governs the maximum possible IOPS for a new workload 142 depending on the respective service rate.

TABLE 5

Multiple Workload Scenarios (F = Foreground, B = Background)

| Run Details | TPCE1 | TPCE2 | Web1 | Web2 | SIO | Utilization |
|---|---|---|---|---|---|---|
| Service Rate | 14k | 14k | 8k | 8k | 8k | 1 |
| F = TPCE, B = Web | 4k | 4k | 1.2k | 1.2k | 1.2k | 1.02 |
| F = Web, B = TPCE | 1k | 1k | 3k | 3k | 1k | 1.03 |
| F = TPCE + Web | 2.3k | 2.3k | 2.3k | 2.3k | 0.6k | 0.98 |

For example, in this table, stand-alone service rates have been observed for three unique workloads named TPCE, Web, and SIO as 14 k, 8 k, and 8 k, respectively. In different configurations of multiple TPCE and Web workloads running simultaneously on the storage system in either the foreground or background, IOPS for these workloads can be observed at maximum utilization.

TABLE 6

Estimated maximum IOPS for new workload (WL5) in the presence of four other workloads.

| Volume | WL1 | WL2 | WL3 | WL4 | WL5 |
|---|---|---|---|---|---|
| Service Rate | 19975 | 14869 | 10003 | 5776 | 2833 |
| Current IOPS | 3200 | 1700 | 800 | 200 | 1730 (estimated Max) |

Given the calculated service rates of workloads and current IOPS as measured from the storage system, maximum IOPS can be estimated for a new workload 142 to be provisioned, and this estimated maximum can be displayed to a user on the dashboard 140 along with characteristics of the new workload 142, among other data (330). In this example table, WL5 is a new workload to be provisioned on a storage system with existing workloads 1-4. Knowing the service rates of workloads 1-4 and the current IOPS from the performance counters 162, individual storage system utilization for each of the workloads can be calculated. With the service rate for WL5 and relative utilizations for the existing workloads, WL5's estimated maximum IOPS can be calculated from the residual utilization.

In some aspects, the regression module 120 can compute the utilization for workloads on all aggregates in the storage system (340). The utilizations of the aggregates can then be displayed to a storage server admin or user along with workload characteristics on the dashboard 140 (342). The admin can choose to provision new workloads 142 to minimally utilized aggregates or provision to aggregates where the dominating workload has similar characteristics to the workload to be provisioned, for example. In other aspects, the provisioning advisor 105 can use the utilization data and workload characteristics to redistribute workloads between nodes in a cluster in order to maximize performance (344).

FIG. 4 illustrates an example method 400 for predicting input/output operation performance of a new workload 142 on a storage system, in accordance with some aspects. Regression module 120 can estimate a maximum IOPS on the storage system for each of a plurality of combinations of values for a plurality of workload characteristics by modeling a relationship between the plurality of workload characteristics and one or more performance metrics observed from the storage system (410). Performance module 110 can update a set of working tables 114 that map each of the plurality of combinations of values to the estimated maximum IOPS for that bucket (420) and predict input/output operation performance of a new workload 142 on the storage system using the set of working tables 114 and workload characteristics for the new workload 142 (430).

Computer System

Figure 5:
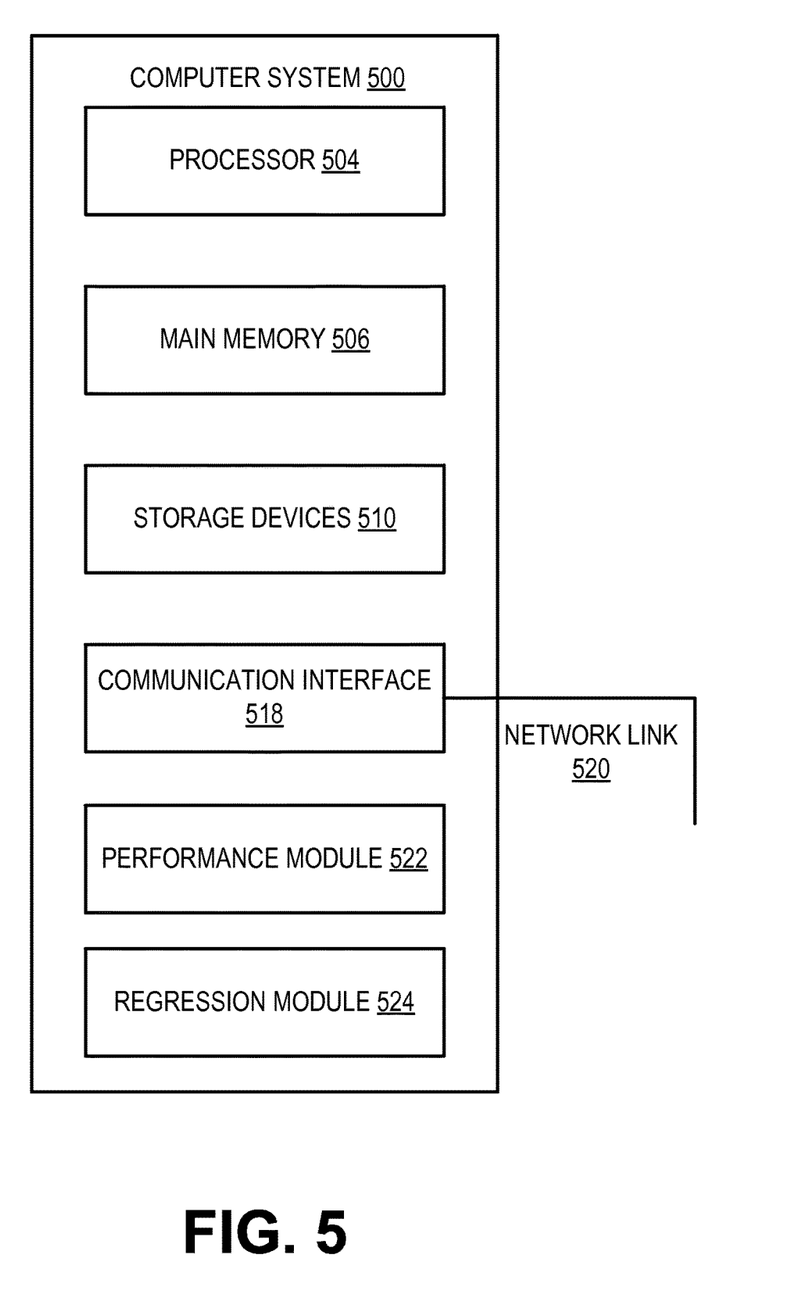
FIG. 5 is a block diagram that illustrates a computer system upon which aspects described herein may be implemented.

FIG. 5 is a block diagram that illustrates a computer system upon which aspects described herein may be implemented. For example, in the context of FIG. 1, storage system environment 100 may be implemented using one or more servers such as described by FIG. 5.

In an embodiment, computer system 500 includes processor 504, memory 506 (including non-transitory memory), storage device 510, and communication interface 518. Computer system 500 includes at least one processor 504 for processing information. Computer system 500 also includes the main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 may also include a read only memory (ROM) or other static storage device for storing static information and instructions for processor 504. The storage device 510, such as a magnetic disk or optical disk, is provided for storing information and instructions. The communication interface 518 may enable the computer system 500 to communicate with one or more networks through use of the network link 520 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks). Computer system 500 can also include performance module 522 and regression module 524 for predicting input/output operation performance of workload on the computer system 500.

Examples described herein are related to the use of computer system 500 for implementing the techniques described herein. According to one embodiment, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative aspects, hardwired circuitry may be used in place of or in combination with software instructions to implement aspects described herein. Thus, aspects described are not limited to any specific combination of hardware circuitry and software.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an embodiment, can be combined with other individually described features, or parts of other aspects. Thus, absence of describing combinations should not preclude the inventor(s) from claiming rights to such combinations.

What is claimed is:

1. An adaptive workload provisioning system comprising:
a memory resource to store instructions;
one or more processors using the instructions stored in the memory resource to:
estimate a maximum number of input/output operations (IOPS) on a storage system for each of a plurality of combinations of values for a plurality of workload characteristics by modeling a relationship between the plurality of workload characteristics and one or more performance metrics observed from the storage system; wherein the plurality of workload characteristics for the combinations of values include randomness of input/output (IO) operations, IO request size, and a distribution between read and write IOs;
update a set of working tables that map each of the plurality of combinations of values to the estimated maximum IOPS for that combination of values;
predict the input/output operation performance of a new workload on the storage system using at least the set of working tables and workload characteristics for the new workload; wherein prior to commissioning the storage system, a pilot run using a subset of the plurality of workload characteristics is executed for estimating the maximum IOPS for the storage system.

2. The system of claim 1, wherein the one or more processors use further instructions to:
create a set of master tables by estimating the maximum IOPS for a plurality of workloads on the storage system; and
copy the set of master tables into the set of working tables when the storage system is commissioned.

3. The system of claim 1, wherein the one or more processors use further instructions to:
display the predicted input/output operation performance to a user of the storage system on a dashboard.

4. The system of claim 1, wherein the prediction of input/output operation performance of the new workload on the storage system also considers current utilization of the storage system.

5. The system of claim 1, wherein the storage system automatically re-provisions workloads based on predicted input/output operation performances of workloads.

6. The system of claim 1, wherein modeling the relationship between the plurality of workload characteristics and one or more performance metrics observed from the storage system uses a robust linear regression.

7. A method of predicting input/output operation performance of a workload on a storage system, the method being implemented by one or more processors and comprising:

estimating a maximum number of input/output operations (IOPS) on the storage system for each of a plurality of combinations of values for a plurality of workload characteristics by modeling a relationship between the plurality of workload characteristics and one or more performance metrics observed from the storage system; wherein the plurality of workload characteristics for the combinations of values include randomness of input/output (IO) operations, IO request size, and a distribution between read and write IOs;

updating a set of working tables that map each of the plurality of combinations of values to the estimated maximum IOPS for that combination of values;

predicting the input/output operation performance of a new workload on the storage system using at least the set of working tables and workload characteristics for the new workload; wherein prior to commissioning the storage system, a pilot run using a subset of the plurality of workload characteristics is executed for estimating the maximum IOPS for the storage system.

8. The method of claim 7, further comprising:
creating a set of master tables by estimating the maximum IOPS for a plurality of workloads on the storage system; and
copying the set of master tables into the set of working tables when the storage system is commissioned.

9. The method of claim 7, further comprising:
displaying the predicted input/output operation performance to a user of the storage system on a dashboard.

10. The method of claim 7, wherein the prediction of input/output operation performance of the new workload on the storage system also considers current utilization of the storage system.

11. The method of claim 7, wherein the storage system automatically re-provisions workloads based on predicted input/output operation performances of workloads.

12. The method of claim 7, wherein modeling the relationship between the plurality of workload characteristics and one or more performance metrics observed from the storage system uses a robust linear regression.

13. A non-transitory computer-readable medium that stores instructions, executable by one or more processors, to cause the one or more processors to perform operations that comprise:
estimating a maximum number of input/output operations (IOPS) on a storage system for each of a plurality of combinations of values for a plurality of workload characteristics by modeling a relationship between the plurality of workload characteristics and one or more performance metrics observed from the storage system; wherein the plurality of workload characteristics for the combinations of values include randomness of input/output (IO) operations, IO request size, and a distribution between read and write IOs;

updating a set of working tables that map each of the plurality of combinations of values to the estimated maximum IOPS for that combination of values;

predicting the input/output operation performance of a new workload on the storage system using at least the set of working tables and workload characteristics for the new workload; wherein prior to commissioning the storage system, a pilot run using a subset of the plurality of workload characteristics is executed for estimating the maximum IOPS for the storage system.

14. The non-transitory computer-readable medium of claim 13, wherein the one or more processors use further instructions to:
create a set of master tables by estimating the maximum IOPS for a plurality of workloads on the storage system; and
copy the set of master tables into the set of working tables when the storage system is commissioned.

15. The non-transitory computer-readable medium of claim 13, wherein the one or more processors use further instructions to:
display the predicted input/output operation performance to a user of the storage system on a dashboard.

16. The non-transitory computer-readable medium of claim 13, wherein the prediction of input/output operation performance of the new workload on the storage system also considers current utilization of the storage system.

17. The non-transitory computer-readable medium of claim 13, wherein the storage system automatically re-provisions workloads based on predicted input/output operation performances of workloads.

18. The non-transitory computer-readable medium of claim 13, wherein modeling the relationship between the plurality of workload characteristics and one or more performance metrics observed from the storage system uses a robust linear regression.

* * * * *